US005743952A

United States Patent [19]

Skuse et al.

[11] Patent Number: 5,743,952
[45] Date of Patent: Apr. 28, 1998

[54] AQUEOUS SUSPENSIONS OF INORGANIC MATERIALS

[75] Inventors: David Robert Skuse, Truro Cornwall; Warren Paul Eagles, Loughborough; Keith Robert Rogan, St. Austell, all of United Kingdom

[73] Assignee: ECC International Ltd., England

[21] Appl. No.: 704,553

[22] PCT Filed: Mar. 16, 1995

[86] PCT No.: PCT/GB95/00563

§ 371 Date: Nov. 21, 1996

§ 102(e) Date: Nov. 21, 1996

[87] PCT Pub. No.: WO95/25146

PCT Pub. Date: Sep. 21, 1995

[30] Foreign Application Priority Data

Mar. 17, 1994 [GB] United Kingdom ............... 9405275

[51] Int. Cl.$^6$ ................................ C04B 14/20
[52] U.S. Cl. ............... 106/416; 106/400; 106/401; 106/425; 106/437; 106/464; 106/465; 106/483; 106/484; 106/486; 106/487; 106/488; 501/144; 501/145; 501/146; 501/147; 501/148; 501/149
[58] Field of Search ................... 106/400, 401, 106/416, 425, 464, 437, 465, 483, 484, 486, 487, 488; 501/145, 146, 144, 147, 148, 149

[56] References Cited

U.S. PATENT DOCUMENTS

| 3,857,781 | 12/1974 | Maynard | 209/5 |
| 5,154,767 | 10/1992 | Kunkle et al. | 106/439 |
| 5,223,463 | 6/1993 | Bilimoria et al. | 501/146 |

FOREIGN PATENT DOCUMENTS

| DFA2030349 | 12/1861 | Germany. |
| 2019822 | 11/1979 | United Kingdom. |
| WO82/02008 | 6/1982 | WIPO. |

*Primary Examiner*—Mark L. Bell
*Assistant Examiner*—Scott L. Hertzog
*Attorney, Agent, or Firm*—Suzanne Kikel

[57] ABSTRACT

A process for improving the rheological properties of an aqueous suspension of a particulate inorganic material which comprises the steps of: (a) forming an aqueous suspension of the particulate inorganic material and an effective amount of an anionic polyelectrolyte dispersing agent; (b) diluting the suspension formed in step (a) with water while maintaining the particulate in the dispersed state of step (a) to give a solids concentration of not less than 20% by weight of the particulate inorganic material; and (c) reconcentrating the diluted suspension formed in step (b) to give a solids concentration of at least 50% by weight of the particulate inorganic material.

13 Claims, No Drawings

AQUEOUS SUSPENSIONS OF INORGANIC MATERIALS

This invention relates to a method for preparing a rheologically stable, concentrated aqueous suspension of a finely divided particulate inorganic material, particularly a finely divided particulate natural or synthetic mineral material, such as a clay or an alkaline earth metal carbonate pigment.

It is often advantageous to produce and distribute mineral pigment or filler materials, especially to the paper and water based paints industries, in the form of a concentrated suspension in water. A user receiving a mineral material in this form is able to avoid the high energy and capital costs which would be involved in the mixing of a dry material with water to form a suspension on his own premises, and, if the mineral material is produced by a wet route, the producer is able to avoid the costs of complete drying of the material. A concentrated aqueous suspension is also easy to handle and convey, and presents no dust problem.

The rheological properties of an aqueous suspension of a particulate inorganic material depend upon a number of factors including the concentration of solid material in the suspension, the particle size distribution of the solid material, as indicated, for example, by the median particle diameter of the distribution, and the type and amount of dispersing agent which is used. Generally, a suspension becomes more viscous, or less fluid, as the solids concentration is increased, or as the median particle diameter of the particle size distribution is reduced. Also there is an increasing tendency for the suspension to become more viscous with time on storage. Assuming that an effective dispersing agent for the inorganic material is available, it is generally found that there is an optimum amount of the dispersing agent which must be added to the suspension to give maximum fluidity and maximum rheological stability, other factors being kept the same.

According to a first aspect of the present invention, there is provided a process for improving the rheological properties of an aqueous suspension of a particulate inorganic material which comprises the steps of:

(a) forming an aqueous suspension of the particulate inorganic material and an effective amount of an anionic polyelectrolyte dispersing agent;

(b) diluting the suspension formed in step (a) with water to give a solids concentration of not less than 20% by weight of the particulate inorganic material; and (c) reconcentrating the diluted suspension formed in step (b) to give a solids concentration of at least 50% by weight of the particulate inorganic material.

The suspension formed in step (c) is suitable for transportation and/or use without the addition of a further quantity of dispersing agent.

Steps (b) and (c) of the process of the invention may advantageously be repeated one or more times.

The suspension formed in step (a) preferably contains at least 50%, and preferably at least 60% by weight of the particulate inorganic material.

In step (a), the particulate inorganic material is typically a natural or synthetic mineral material. The invention has been found to be particularly suited to the treatment of paper coating pigments, paper fillers or pigments or extenders for use in water-based paints. The particulate mineral material may advantageously be kaolin clay or calcium carbonate. Generally the particulate inorganic material will have a particle size distribution such that at least 45% by weight, and preferably at least 50% by weight, of the particles have an equivalent spherical diameter smaller than 2 μm.

The anionic polyelectrolyte is typically used in an amount of at least 0.05% by weight, based on the weight of the particulate inorganic material, although the optimum amount to achieve dispersion of the inorganic material can be determined by the skilled person without difficulty. The anionic polyelectrolyte dispersing agent is advantageously a water soluble salt of poly(acrylic acid) or of poly (methacrylic acid) having a weight average molecular weight of not more than 20,000, as determined by gel permeation chromatography using a low angle laser light scattering detector. The anionic polyelectrolyte dispersing agent may, for example, be an alkali metal (for example sodium) or ammonium salt of a poly(acrylic acid) or a poly(methacrylic acid). Sodium polyacrylate having a weight average molecular weight in the range from 1,000 to 10,000 is especially suitable. The amount of the anionic polyelectrolyte dispersing agent used is advantageously in the range of from 0.1 to 2.0% by weight, based on the weight of the particulate inorganic material.

The anionic polyelectrolyte is typically fully neutralised. However, it is within the scope of the present invention for the anionic polyelectrolyte to be partially neutralised (cf. EP-A-0100948).

In step (b), the suspension is preferably diluted so as to reduce the solids concentration by at least 5 percentage points. It is also preferred that the suspension is not over-diluted as this has been found to give unacceptable results, as well as being undesirable from an economic point of view; thus, the solids concentration should preferably not be reduced below about 30% by weight of the particulate inorganic material. Typically, the suspension will be diluted to a solids concentration in the range of from 30% to 70% by weight, more preferably to a solids concentration in the range of from 30% to 60% by weight.

In step (c), the diluted suspension is preferably reconcentrated by means of a centrifuge, such as a high speed centrifuge or by means of a filtration device such as a membrane filtration device of the type described, for example, in U.S. Pat. No. 5,223,463. The membrane filtration device may be, for example, of the plate and frame, tubular or spiral type. There is no requirement in reconcentration step (c) for a flocculating agent to be added.

In step (c) it is preferred to reconcentrate the diluted suspension formed in step (b) to give a solids concentration of at least 60% by weight of the particulate inorganic material.

It is found that, by the process of the invention, the viscosity of a suspension of a finely divided, particulate inorganic material, for a given solids concentration, median particle diameter of the inorganic material and dose of dispersing agent is considerably reduced, and the tendency for the suspension to "gel", or increase in viscosity on storage, is also reduced.

In this invention, the percentages by weight of particles having an equivalent spherical diameter smaller than a given value are determined from a particle size distribution curve produced by a SEDIGRAPH particle size analyser.

The invention will now be illustrated, by the following non-limiting examples.

EXAMPLE 1

A sample of a Cornish kaolin clay having a particle size distribution such that 75% by weight consisted of particles having an equivalent spherical diameter smaller than 2 μm was suspended in water containing 0.3% by weight, based on the weight of the dry kaolin clay, of a sodium polyacrylate dispersing agent having a weight average molecular weight of 4,000 to form a suspension containing 67.7% by weight of dry clay. The suspension was divided into six portions which were diluted with water to solids concentrations of, respectively, 65%, 60%, 55%, 50%, 30% and 10% by weight of dry clay. Each portion was then reconcentrated to a solids concentration of 67.7% by weight of dry by removing water in a high speed centrifuge. A further portion was left untreated as a control. The viscosity of each portion of suspension was measured by means of a Brookfield Viscometer at a spindle speed of 100 r.p.m. immediately upon the completion of the treatment, and again after storage for 1 hour and 24 hours respectively. The results obtained are set forth in Table 1 below:

TABLE 1

| Diluted Solids concentration | Brookfield Viscosity (Mpa · s) at time (hr.) | | |
|---|---|---|---|
| (wt. %) | 0 | 1 | 24 |
| Control | 440 | 440 | 470 |
| 65 | 400 | 420 | 400 |
| 60 | 320 | 350 | 300 |
| 55 | 285 | 300 | 260 |
| 50 | 260 | 275 | 220 |
| 30 | 280 | 290 | 220 |
| 10 | 1440 | 1440 | 1340 |

These results show that the viscosity of the final product suspension of solids concentration 67.7% by weight is lowest, and the suspension has the best rheological stability, when the deflocculated suspension is diluted to 50% by weight before reconcentration to 67.7% by weight. If too much dilution water is added, i.e. if the solids concentration is reduced to about 10% by weight before reconcentration, the viscosity of the reconcentrated suspension becomes unacceptably high.

EXAMPLE 2

A fine calcium carbonate material having a particle size distribution such that 95% by weight consisted of particles having an equivalent spherical diameter smaller than 2 μm was prepared in an aqueous suspension having a solids concentration of 75.0% by weight and containing 0.8% by weight, based on the weight of dry calcium carbonate, of the same sodium polyacrylate dispersing agent as was used in Example 1.

The suspension was divided into two portions. One portion was treated in accordance with the invention by the addition of sufficient water to dilute the suspension to a solids concentration of 50% by weight and subsequent reconcentration in the high speed centrifuge to a solids concentration of 75.0% by weight. The other portion was left untreated.

The Brookfield viscosity of the two portions of suspension were determined immediately after preparation, and after standing for 1 hour and 24 hours, respectively, and the results obtained are set forth in Table 2 below:

TABLE 2

| | Brookfield Viscosity (mPa · s) at time (hr.) | | |
|---|---|---|---|
| | 0 | 1 | 24 |
| Untreated | 160 | 310 | 560 |
| Treated | 105 | 105 | 110 |

These results show that when an aqueous suspension containing 75% by weight of a fine calcium carbonate material is treated in accordance with the invention, it is possible to form a suspension which not only has a lower initial viscosity, but also has a reduced tendency to increase in viscosity on storage, as compared with a suspension prepared in the conventional manner.

EXAMPLE 3

A suspension was prepared containing 30% by weight of a Cornish kaolin clay having a particle size distribution such that 75% by weight consisted of particles having an equivalent spherical diameter smaller than 2 μm. The suspension had a pH of 4.5 and contained no dispersing agent. The suspension was divided into two portions. One portion (Portion A) was diluted with sufficient water to double the volume of the suspension and the other portion (Portion B) was left undiluted. Both portions were then partially dewatered by filtration and the resultant filter cakes were dried for 16 hours in an oven at 80° C. Each portion of dried clay was then re-suspended in water containing 0.3% by weight, based on the weight of dry clay, of the same sodium polyacrylate dispersing agent as was used in Example 1, to form a suspension containing 67.7% by weight of the dry clay. The Brookfield viscosity of each suspension was measured immediately after preparation and after standing for 1 hour and 24 hours, respectively.

Both suspensions were then treated in accordance with the invention by dilution with water to a solids concentration of 50% by weight of dry clay and subsequent reconcentration to a solids concentration of 67.7% by weight by means of the high speed centrifuge. The Brookfield viscosity of each suspension was measured immediately after reconcentration and after standing for 1 hour and 24 hours, respectively. The results are set forth in Table 3 below:

TABLE 3

| | Brookfield Viscosity (mPa · s) at time (hr.) | | |
|---|---|---|---|
| | 0 | 1 | 24 |
| Portion A untreated | 760 | 820 | 1050 |
| Portion B untreated | 880 | 1040 | 1425 |
| Portion A treated | 370 | 360 | 320 |
| Portion B treated | 320 | 330 | 270 |

A comparison of the results for "Portion A untreated" and "Portion B untreated" shows that a reduction in the viscosity of the final concentrated, deflocculated suspension can be achieved by diluting with water a clay suspension which contains no dispersing agent and subsequently dewatering the suspension by filtration and re-suspending the dewatered clay in water containing a dispersing agent to form a concentrated product suspension. However, a comparison of the results for "Portions A and B untreated" and "Portions A and B treated" shows that a much greater reduction in viscosity can be achieved by diluting with water, and subsequently reconcentrating, a suspension to which the required amount of dispersing agent has already been added.

EXAMPLE 4

A Cornish kaolin clay having a particle size distribution such that 75% by weight consisted of particles having an equivalent spherical diameter smaller than 2 μm was suspended in water containing 0.3% by weight, based on the weight of dry kaolin, of the same sodium polyacrylate dispersing agent as was used in Example 1, to form a suspension having a solids concentration of 67.7% by weight. This suspension was divided into two portions. The Brookfield viscosity of one portion was measured immediately after preparation and after standing for 1 hour and 24 hours, respectively. The other portion was treated in accordance with the invention by dilution with water to a solids concentration of 50% by weight followed by reconcentration in the high speed centrifuge. By experimentation, the degree of reconcentration which was required to give a concentrated suspension having approximately the same initial Brookfield viscosity as the untreated suspension was determined. The Brookfield viscosity of this suspension after standing for 1 hour and 24 hours, respectively, were also determined. The results obtained are set forth in Table 4 below:

TABLE 4

| | Solids Concn. (% by wt.) | Brookfield Viscosity (mPa · s) at time (hr.) | | |
|---|---|---|---|---|
| | | 0 | 1 | 24 |
| Untreated | 67.7 | 440 | 440 | 470 |
| Treated | 69.2 | 400 | 400 | 400 |

These results show that, by treatment in accordance with the invention, it is possible to achieve a deflocculated kaolin suspension which has a higher solids concentration for a given viscosity than an untreated suspension.

EXAMPLE 5

A suspension contained 76.0% by weight of a ground calcium carbonate having a particle size distribution such that 95% by weight consisted of particles having an equivalent spherical diameter smaller than 2 μm, and 0.8% by weight, based on the weight of dry calcium carbonate, of the same sodium polyacrylate dispersing agent as was used in Example 1. This suspension was divided into two portions. The Brookfield viscosity of one portion was measured immediately after preparation and after standing for 1 hour and 24 hours, respectively. The other portion was treated in accordance with the invention by dilution with water to a solids concentration of 50% by weight followed by reconcentration in the high speed centrifuge. By experimentation, the degree of reconcentration which was required to give a concentrated suspension having approximately the same initial Brookfield viscosity as the untreated suspension was determined. The Brookfield viscosity of this suspension after standing for 1 hour and 24 hours, respectively, were also determined. The results obtained are set forth in Table 5 below:

TABLE 5

| | Solids Concn. (% by wt.) | Brookfield Viscosity (mPa · s) at time (hr.) | | |
|---|---|---|---|---|
| | | 0 | 1 | 24 |
| Untreated | 76.0 | 180 | 450 | 700 |
| Treated | 80.0 | 385 | 445 | 470 |

These results show that, by treatment in accordance with the invention, it is possible to achieve a deflocculated calcium carbonate suspension which has a higher solids concentration for a given viscosity than an untreated suspension.

EXAMPLE 6

A suspension contained 73.0% by weight of a very finely ground calcium carbonate having a particle size distribution such that 95% by weight consisted of particles having an equivalent spherical diameter smaller than 1 μm, and 0.8% by weight, based on the weight of dry calcium carbonate, of the same sodium polyacrylate dispersing agent as was used in Example 1. This suspension was divided into two portions. One portion was diluted with water to a solids concentration of 50% by weight and subsequently reconcentrated by means of the high speed centrifuge to a solids concentration of 73.0% by weight. The other portion was left undiluted. The Brookfield viscosity of each suspension was measured immediately after formation and after standing for 1 hour and 24 hours, respectively, and the results obtained are set forth in Table 6 below:

TABLE 6

| | Brookfield Viscosity (mPa · s) at time (hr.) | | |
|---|---|---|---|
| | 0 | 1 | 24 |
| Untreated | 1980 | 3290 | 4800 |
| Treated | 420 | 610 | 850 |

These results show that, by treatment in accordance with the invention, it is possible to prepare an aqueous suspension containing 73% by weight of a very fine calcium carbonate which suspension has a low initial viscosity and an acceptable increase in viscosity on storage.

EXAMPLE 7

Samples of a Cornish kaolin having a particle size distribution such that 75% by weight consisted of particles having an equivalent spherical diameter smaller than 2 μm were suspended in water to form suspensions having a solids concentration of 67.7% by weight using amounts of the sodium polyacrylate dispersing agent used in Example 1 which varied from 0.11% by weight to 0.67% by weight. In each case the Brookfield viscosity of the suspension was measured immediately after formation and after standing for 1 hour and 24 hours, respectively.

Each suspension was then diluted with water to a solids concentration of 50% by weight and subsequently reconcentrated by means of the high speed centrifuge to a solids concentration of 67.7% by weight. In each case the Brookfield viscosity of the suspension was measured immediately after reconcentration and after standing for 1 hour and 24 hours, respectively.

The results obtained are set forth in Table 7 below:

TABLE 7

| Amount of dispersing agent | Before dilution Brookfield Viscosity (mPa · s) at time (hr.) | | | After reconcentration Brookfield Viscosity (mPa · s) at time (hr.) | | |
|---|---|---|---|---|---|---|
| (wt. %) | 0 | 1 | 24 | 0 | 1 | 24 |
| 0.11 | 5255 | 5500 | 10100 | 800 | 1400 | 2150 |
| 0.15 | 1990 | 3440 | 6650 | 350 | 510 | 820 |
| 0.19 | 1420 | 2700 | 4050 | 330 | 360 | 370 |
| 0.22 | 880 | 1200 | 2200 | 300 | 290 | 250 |
| 0.26 | 800 | 960 | 1200 | 330 | 330 | 250 |
| 0.30 | 880 | 1040 | 1425 | 320 | 330 | 270 |
| 0.37 | 1100 | 1220 | 1600 | 395 | 410 | 340 |
| 0.44 | 1300 | 1400 | 1800 | 570 | 570 | 510 |
| 0.52 | 1590 | 1760 | 2100 | 750 | 790 | 700 |
| 0.59 | 1920 | 2040 | 2500 | 1050 | 1070 | 1000 |
| 0.67 | 2320 | 2450 | 2950 | 1240 | 1250 | 1170 |

From the results for the suspensions before treatment in accordance with the invention it is clear that the optimum amount of dispersing agent required to give the minimum viscosity is 0.26% by weight, based on the weight of dry kaolin. After treatment in accordance with the invention, the optimum amount of dispersing agent is reduced to 0.22% by weight, based on the weight of dry kaolin. Also it can be seen that, after treatment in accordance with the invention, a suspension which has been deflocculated with 0.15% by weight of the dispersing agent, based on the weight of dry kaolin, has rheological properties which are approximately equivalent to, or better than, those given by an untreated suspension which has been deflocculated with 0.26% by weight, based on the weight of dry kaolin, of the dispersing agent.

We claim:

1. A process for improving the rheological properties of an aqueous suspension of a particulate inorganic material which comprises the steps of:
   (a) forming an aqueous suspension comprising particulate inorganic material having particles with at least 45 percent by weight of which have an equivalent spherical diameter of smaller than 2 μm and an effective amount of an anionic polyelectrolyte dispersing agent to cause the particulate inorganic material to be in a dispersed state in the aqueous suspension;
   (b) diluting the suspension formed in step (a) with water while the particles of the particulate inorganic material are in said dispersed state of step (a) to give a suspension having a solids concentration of not less than 20% by weight of the particulate inorganic material; and
   (c) reconcentrating the diluted suspension formed in step (b) to give a suspension having a solids concentration of at least 50% by weight of the particulate inorganic material.

2. A process according to claim 1, wherein steps (b) and (c) are repeated one or more times.

3. A process according to claim 1, wherein the suspension formed in step (a) contains at least 50% by weight of said particulate inorganic material.

4. A process according to claim 1, wherein said particulate inorganic material is a natural or synthetic mineral material.

5. A process according to claim 4, wherein the particulate mineral material is a kaolin clay or a calcium carbonate.

6. A process according to claim 1, wherein the particulate inorganic material has a particle size distribution such that at least 50% by weight of the particles have an equivalent spherical diameter smaller than 2 μ.

7. A process according to claim 1, wherein the anionic polyelectrolyte dispersing agent is a water soluble salt of poly(acrylic acid) or of poly(methacrylic acid) having a weight average molecular weight of not more than 20,000.

8. A process according to claim 1, wherein, in step (b), the suspension is diluted so as to reduce the solids concentration by at least 5 percentage points.

9. A process according to claim 1, wherein, in step (b) the dilution is to a solids concentration in the range of from 30% to 70% by weight of the particulate inorganic material.

10. A process according to claim 9, wherein, in step (b) the dilution is to a solids concentration in the range of from 30% to 60% by weight of the particulate inorganic material.

11. A process according to claim 1, wherein, in step (c), the diluted suspension is reconcentrated by means of a centrifuge or a filtration device.

12. A process according to claim 1, wherein, in step (c) the diluted suspension formed in step (b) is reconcentrated to give a solids concentration of at least 60% by weight of the particulate inorganic material.

13. A process as claimed in claim 1 and wherein the suspension formed in step (c) is suitable for transportation or use without the addition of a further quantity of dispersing agent.

* * * * *